Aug. 4, 1964  W. B. RUGER  3,142,921
CARTRIDGE LIFTER MECHANISM FOR SEMI-AUTOMATIC GUN
Filed March 1, 1961  7 Sheets-Sheet 1

INVENTOR
WILLIAM B. RUGER
BY Pennie, Edmonds,
Morton, Barrows & Taylor
ATTORNEYS Aug. 4, 1964     W. B. RUGER     3,142,921
CARTRIDGE LIFTER MECHANISM FOR SEMI-AUTOMATIC GUN
Filed March 1, 1961     7 Sheets-Sheet 3

INVENTOR
WILLIAM B. RUGER
BY Pennie, Edmonds,
Morton, Barrows & Taylor
ATTORNEYS Aug. 4, 1964  W. B. RUGER  3,142,921
CARTRIDGE LIFTER MECHANISM FOR SEMI-AUTOMATIC GUN
Filed March 1, 1961  7 Sheets-Sheet 5

INVENTOR
WILLIAM B. RUGER
BY Pennie, Edmonds
Morton, Barrows & Taylor
ATTORNEYS

Aug. 4, 1964  W. B. RUGER  3,142,921
CARTRIDGE LIFTER MECHANISM FOR SEMI-AUTOMATIC GUN
Filed March 1, 1961  7 Sheets-Sheet 6

INVENTOR
WILLIAM B. RUGER
BY Pennie, Edmonds,
Morton, Barrows & Taylor
ATTORNEYS

United States Patent Office 3,142,921
Patented Aug. 4, 1964

3,142,921
CARTRIDGE LIFTER MECHANISM FOR
SEMI-AUTOMATIC GUN
William B. Ruger, Southport, Conn., assignor to Sturm,
Ruger and Company, Inc., Southport, Conn., a corporation of Connecticut
Filed Mar. 1, 1961, Ser. No. 106,991
8 Claims. (Cl. 42—17)

This invention relates to semi-automatic firearms, especially to the so-called shoulder arms which include shotguns and rifles, and has for its object the provision of an improved gas-operated firearm of this character. Although various features of the invention are especially applicable to such shoulder arms as rifles and shotguns (hereinafter called rifles or simply guns), other features have utility in firearms generally.

The general aspects of the invention are most advantageously adaptable to rifles and the invention will be described and illustrated with reference to a rifle. The gun of the invention comprises, among other features, several interrelated subdivisions or units including:

(1) A receiver, breechblock and slide combination in which the slide operates within the receiver, (2) A trigger-hammer mechanism and its housing which is removably attached to the receiver, (3) A gas-operated slide of particular construction for operating a breechblock which is mounted within the receiver and the stock, (4) A tubular cartridge magazine, and a lifter means for conveying a cartridge from the magazine to and positioning it for insertion into the barrel chamber, which includes yieldable means for holding the lifter both in its upward and lower positions, and (5) A cartridge stop system for controlling the transfer of cartridges from a tubular magazine to the cartridge lifter.

The aforementioned units provide a rifle which is capable of utilizing not only the usual rifle cartridges, but especially pistol cartridges such as the .44 cal. magnum which is relatively heavy and difficult to feed from a tubular magazine in semi-automatic firing.

The receiver encloses or contains a reciprocal breechblock (hereinafter simply called a bolt) having a plurality of ribs and grooves which coact with ribs and grooves on the receiver to guide the bolt and to provide locking means between the receiver and the rear of the bolt. The receiver has an internal slot for the travel of a flat slide for operating the bolt, and means for the removable attachment of a trigger housing thereto. The slide and bolt are exposed to view only through an ejection port and bolt-handle slot in the receiver. The bolt is so constructed that it is normally held secure in its guided position in the receiver, but when the slide and trigger housing are removed and the bolt is moved sideways and turned to a certain position it can be removed downward from the receiver.

The trigger housing has mounted therein the trigger, sear and disconnector assembly, the hammer, and a cartridge lifter means and related operating mechanisms which function in combination with a tubular magazine. The receiver and trigger housing are removably connected together and when disconnected contain their aforementioned elements.

The slide is a particularly important feature of the gun in that it is an integral element having cam operating means at one end for operating the bolt and cocking the hammer, and means at the forward end for receiving the impact of the operating gas piston. The slide is shaped to operate virtually concealed by the stock and receiver, and has means at the forward end for sliding over the magazine tube and engaging a return spring which is mounted around the magazine tube. An important feature of the slide is its construction of flat sheet metal and a sleeve secured within an annular forward end.

The tubular magazine is connected to the trigger housing at the rear and to a block on the barrel at the front, said block having mounted therein a gas-operated piston for driving the slide. The tubular magazine is arranged to feed a cartridge into the trigger housing and place it on a cartridge lifter which is in operative connection with the slide and includes a release catch which permits a return of the bolt only after a cartridge has been properly positioned on the lifter. The lifter mechanism includes a resiliently operated means which not only holds the lifter in its upper position but in its lower position from which it is displaceable for loading the magazine.

The invention utilizes means for holding and controlling the movement of cartridges from the tubular magazine to the cartridge lifter. The slide includes means to engage the cartridge holding means which holds the leading cartridge in the magazine. As the slide travels rearward it sets the holding means to release the leading cartridge which is pushed on to the lifter, and the next leading cartridge is held by the holding means until the cycle is repeated. The cartridge holding means also engage and hold the cartridges as they are being pushed into the magazine.

The bolt has within it a firing pin having a rearward collar and a rebound spring which normally holds the firing pin away from the cartridge. The bolt has an arcuate cut with cam surfaces for locking and unlocking the bolt by a cam lug on the slide and this cut is proportioned so that when the bolt is turned to a certain position the cam lug can be removed with the slide. A part of this cut intersects the hole in which the firing pin is mounted forming a window through which a part of the collar projects. The lug on the slide includes a projection which can engage the collar and mechanically hold the firing pin out of contact with a cartridge being pushed into the chamber until the bolt is locked. This mechanical holding of the firing pin is an auxiliary which retracts the firing pin in the event of failure of the rebound spring.

The slide and means for the application of gas thereto are so constructed and arranged that the gun can have a one-piece stock of the type used on bolt-action rifles within which the slide is concealed. Also the receiver and slide are so constructed that the slide serves as a closure of the ejection port when the slide is in its forward position.

These and other novel features of the invention will be better understood after considering the following discussions taken in conjunction with the accompanying drawings in which.

The embodiment of the invention illustrated in the drawings is a semi-automatic gas-operated rifle especially constructed and arranged to function with rimmed pistol cartridges, such, for example, as the 44 cal. magnum pistol cartridge which has a substantially cylindrical case and a heavy flat-nosed lead bullet. Because of their weight and shape these cartridges are very difficult to feed from a tubular magazine into the barrel in semi-automatic function.

The rifle, preferably and very advantageously, comprises a single or one piece stock 1 of the type used on bolt action rifles of the Mauser type, a receiver 2 having a barrel 3 threaded therein and a trigger housing 4 removably attached to the under portion of the receiver. The stock has a receiver attaching block 5 secured thereto by the screw 6. The receiver has a tail piece in the form of a hook 7 which engages an angular slot 8 in the block to removably secure the end of the receiver to the stock. The barrel has a depending block 12 attached to the under surface which is tapped and threaded to receive the stock securing screw 13. (The stock may also be attached by a band.) When screw 13 is removed, the forward end of the gun can be lifted from the stock and the tail piece 7 swings out of its engagement with the slot 8 of block 5. This construction provides a simple take-down and a very appealing appearance. Not only does the stock conceal nearly all of the functioning elements, but there are no external openings between the barrel, the receiver and the stock.

Figure 16:
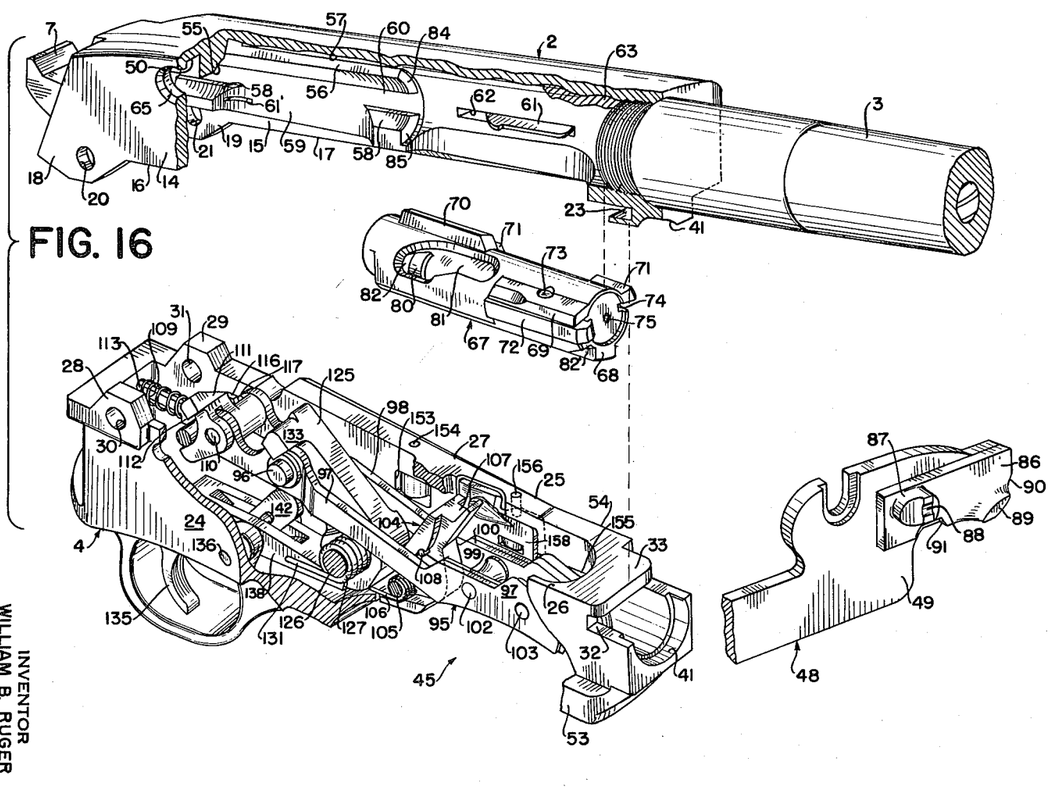
FIG. 16 is an exploded perspective view with parts in section of a major portion of the operating mechanism of the rifle shown in FIGS. 1–15.

The receiver as best shown in FIG. 16 has a hollow interior with sides 14 and 15 having flat under edges 16 and 17 (FIG. 10) and rear side extensions 18 and 19 having holes 20 and 21 (FIG. 16), and the forward end has a transverse coupling slot 23. The trigger housing 4 is also hollow and has sides 24 and 25 with flat upper surfaces 26 and 27 under edges 16 and 17 of the receiver 4. The upwardly extending lugs 28 and 29 have holes 30 and 31 and the forward end has a transverse slot 32 and lip 33. The upper flat part of lip 33 fits under the receiver. The trigger housing is secured to the receiver by inserting the lip 33 into the slot 23, placing the lugs 28 and 29 between the extensions 18 and 19 and inserting the coupling pin 34 through the holes.

The tubular magazine 40 is inserted into an annular groove 41 which is formed in both the receiver and the trigger housing at one end and is secured at the forward end by the integral plug 42 and cross pin 43, which plug has a projection 44 (FIG. 1) entering a hole in the block 12. The return spring 47 is mounted around the outside of the magazine and bears at the rear against the trigger housing and face of receiver and at the front against the sleeve 52 which is part of the slide 48.

Figure 9:
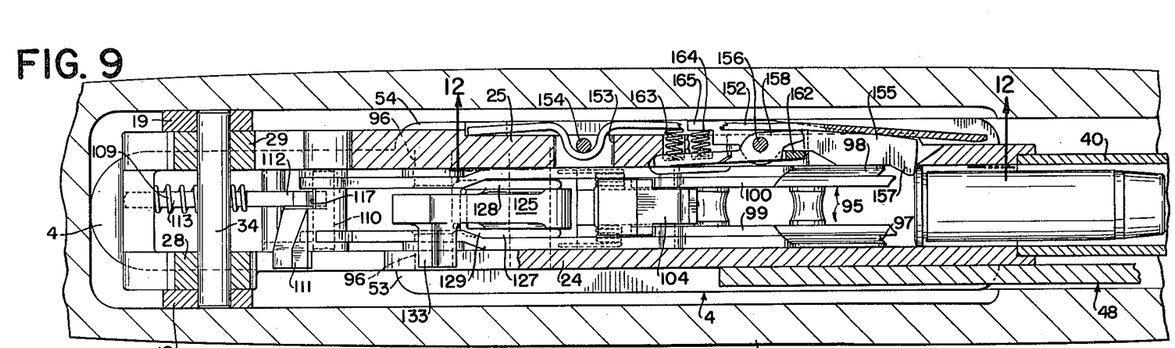
FIG. 9 is a plan view at 9—9 of FIG. 2.
Figure 18:
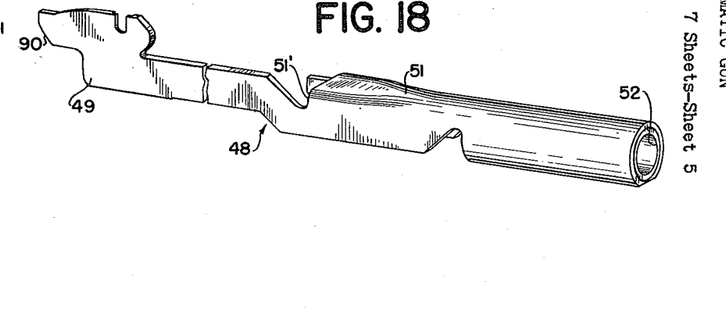
FIG. 18 is a perspective of the slide.

The slide 48 is formed of flat metal and has a rearward part 49 which travels in the narrow vertical slot 50 in one side of the receiver (FIGS. 10 and 16), a generally U-shaped portion 51 (FIG. 1) which travels over the magazine 40 and return spring 47, and a tubular forward end in which is secured a slide sleeve 52 (FIGS. 1 and 18) which surrounds and travels over the magazine 40. The abutting edges of the forward end of the slide may be welded together and to the sleeve 52, and then cut to a flattened under surface. The sides of the trigger housing have thick areas or cheeks 53 and 54 (FIGS. 9 and 10) to provide an enlarged portion for the opening 45 through which the magazine is loaded, and also to provide a flat surface 46 on which the slide travels.

Figure 6:
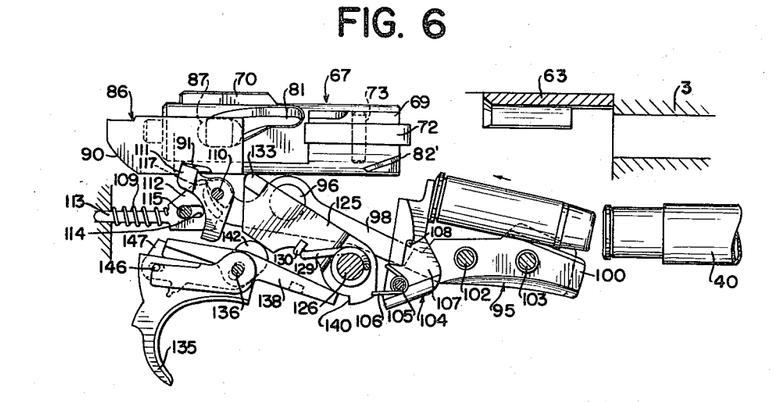
Figure 7:
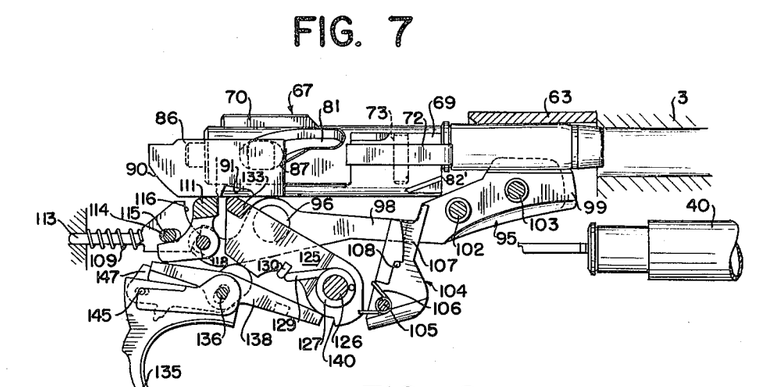

The receiver, as best shown in FIGS. 2, 3, 10 and 16, has longitudinal ribs 55, 56 and 58 between which are guide grooves 57 and 60. Rib 58 is cut away at 59 to facilitate removal of the bolt after the slide and trigger housing are removed. The guide groove 60 is between ribs 56 and 58. The cartridge ejector 61 is mounted in the slot 62 and is held by a pin (not shown). The tail (not shown) of the ejector projects into a slot 61′ in the rear of the receiver and since the ejector is made of flat spring steel, it can be pushed out of the way when the bolt is closed. As shown in FIGS. 6 and 7 the receiver roof or stop 63 is mounted to the under side of the upper forward wall of the receiver and depends into the interior to form a stop for the top of the cartridge as it is in position to enter the chamber. The right side of the receiver (FIGS. 1 and 17) has an ejection port 64 and a contiguous slot 65 for the operating handle 66 on the slide.

Figures 3, 3A, 4:
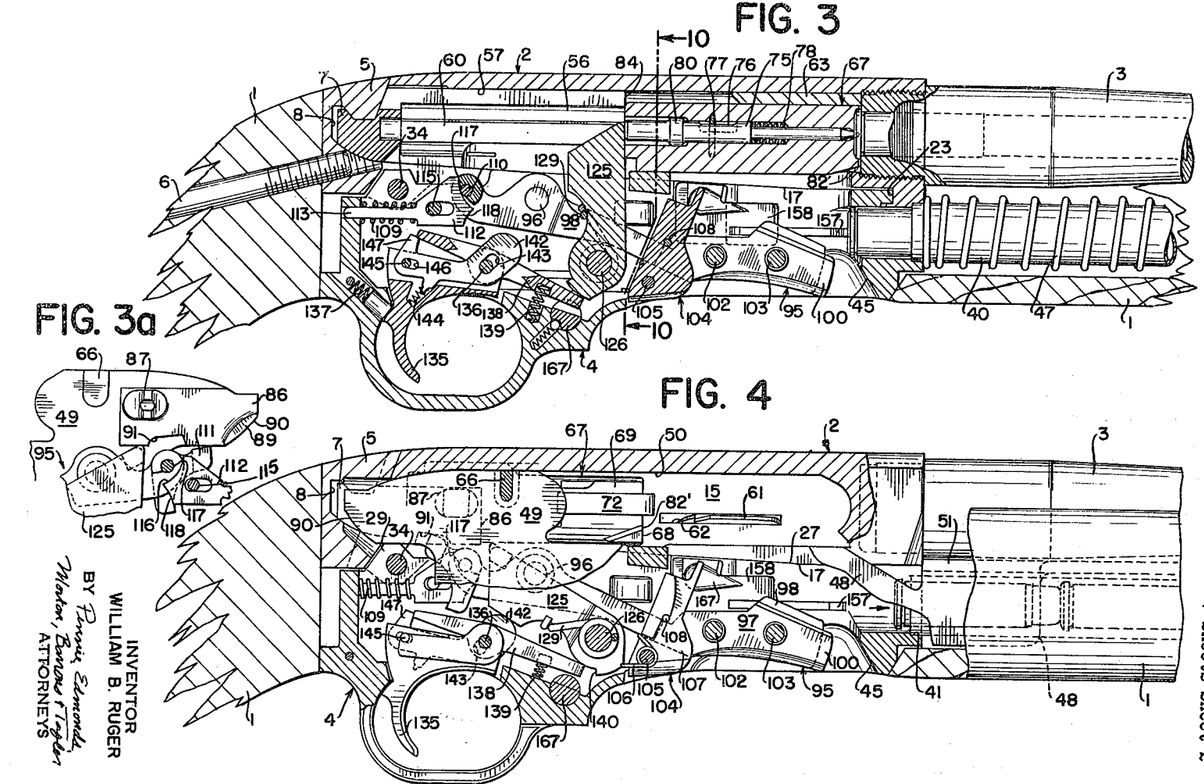
FIG. 3 is a view similar to FIG. 2 at the instant the hammer has struck the firing pin.
FIG. 3a is a fragmentary view of the rearward portion of the slide and associated parts as if viewed from the opposite side of FIG. 3 but with the parts in a different position.
FIG. 4 is a view similar to FIGS. 2 and 3, showing different parts in section, after firing with the bolt in its most rearward position.

The bolt 67 is a unitary member having longitudinal ribs 68, 69, 70 and 71. The rib 70 travels in groove 57 and the rib 71 travels in groove 60. Rib 69 has a longitudinal slot in which the extractor 72 is mounted and held in position by the pin 73. The rib 71 has a cut through the middle dividing it into two parts to function with the cut 59 to facilitate removing the bolt from the receiver and also a longitudinal slot 74 in the front part of the rib which permits the bolt to travel over the ejector 61. The interior of the bolt is bored out as best shown in FIG. 3 to receive the firing pin 75 which has a flat cut 76 through which the pin 77 crosses to limit the movement of the firing pin. The firing pin has a rebound spring 78 which holds it out of contact with the cartridge primer. The rearward end of the firing pin has an annular collar 80. Near the top and towards one side of the bolt an arcuate cam 81 is cut to engage the actuating lug on the slide. The bore for the firing pin has a large diameter at the rear and this results in the opening or window 82 (FIG. 16) through which the collar 80 projects into the opening of the cam 81, the function of which will be described hereinafter. The forward end of the bolt has an inclined cut 82 which engages the cartridge lifter to start it moving downward as the forward end of the cartridge is inserted into the chamber.

It will be noted that the faces 83, 84 and 85 (FIG. 10) of the ribs 55, 56 and 58 respectively are cut so as to deviate angularly approximately 3° from a plane transverse to the longitudinal axis of the receiver. The ribs 68, 70 and 71 are the locking lugs for the bolt and their rearward faces are also displaced angularly (about 3°) from the plane transverse to the longitudinal axis of the receiver. These lugs make bearing contact with the faces 83, 84 and 85 when the bolt is turned clockwise to its locked position for firing.

Figure 1:
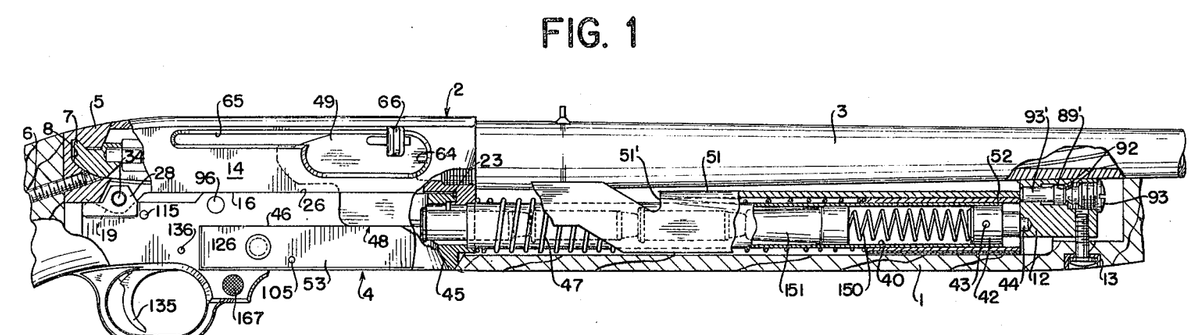
FIG. 1 is a side elevation, with parts removed, of a semi-automatic rifle embodying the invention.

The slide 48 as previously stated has a rearward flat and upright portion 49, the upper portion of which is slotted to receive the bolt-operating handle 66. The inside of the part 49, as best shown in FIG. 16, has a plate 86 either unitary therewith or attached thereto as by welding or rivets. This plate has a projecting lug 87 having curved surfaces which engage the cam slot 81 of the bolt to effect the turning action from the locked to the unlocked positions and vice versa. This lug has a radial cut 88 on its rearward face which travels over the radial surface of the bottom of the cam slot 81 and engages the collar 80 on the firing pin. This radial cut 88 provides a positive mechanical stop which prevents the firing pin from contacting a cartridge primer unless the slide has moved forward and locked the bolt. The inside of the plate has a projection 89 which prevents the slide from moving forward in the event the lug 87 is broken. As best shown in FIGS. 5, 6, 7 and 8 the slide has a rearward cam surface 90 on the plate part 86 which engages an extension 133 of the hammer to cock the hammer on the rearward stroke, and the under surface of the rearward part has a notch 91 for holding the slide in its rearward position, as will be described hereinafter. The forward end of the slide has welded or otherwise secured thereto the sleeve 52 as previously described. This sleeve not only serves as a guide for the slide but adds weight to the slide to give it the necessary momentum to operate the bolt and cock the hammer. As shown in FIG. 1, the forward end of the slide is held near to, or against the barrel block 12 by the return spring 47, when in firing position. The block 12 has a cylindrical bore 89' connected by port 92 to the barrel and a closure screw plug 93. The operating plunger 93' is driven rearward by barrel gas only a fraction of an inch to strike the forward end of the slide 48 and impel the slide rearward.

Figure 5:
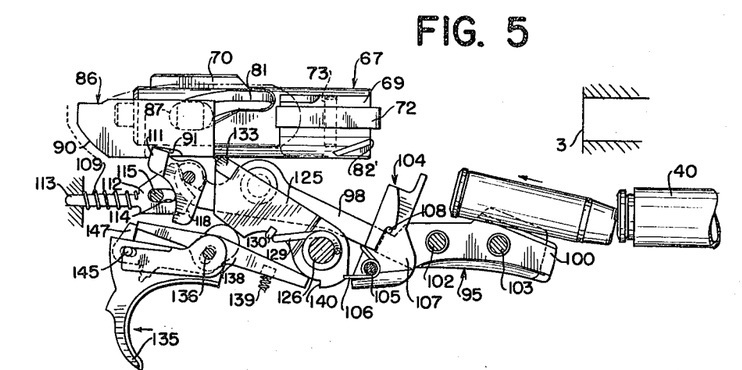
FIGS. 5, 6, 7 and 8 illustrate elements of the invention somewhat diagrammatically to show a sequence of the arrangement of the elements in the movement of a cartridge from the tubular magazine into the barrel chamber.

The trigger housing 4 as best illustrated in the perspective of FIG. 16 has several elements mounted therein. It will be noted with reference to FIG. 9 that the sides 24 and 25 have outward side extensions 53 and 54 to provide for the relatively wide cut opening 45 through which cartridges are loaded into the magazine. The cartridge lifter 95 is pivotally mounted in the trigger housing by studs 96. This lifter includes two side bars 97 and 98 to which are attached on the interior short plates 99 and 100. These short plates and the bars 97 and 98 are held in their assembled positions by the spacer blocks 102 and 103 which also serve as rivets to hold these parts together and in their spaced relation as illustrated, for example, in FIGS. 9 and 16. The cartridge lifter latch 104, as best shown in FIGS. 3 and 16, is pivotally mounted on pin 105 and is oscillatable in the space between the bars 97 and 98. It is urged in the clockwise direction by the torsion spring 106. It will be noted in FIGS. 2, 3, 4 and 16 that the plates 99 and 100 extend on each side of the narrowed portion 107 of the lifter latch, the edges of which plates are engaged by a cross-pin 108, the function of which is to hold the lifter down as shown in FIGS. 5 and 16 or to release it when the lifter latch is struck by a cartridge, as shown in FIGS. 6 and 7. The lifter latch may be operated manually by pressing its exposed lower end, and by this means the lifter may be freed from the latch and pushed upward and inward when cartridges are to be inserted into the magazine.

Figure 8:
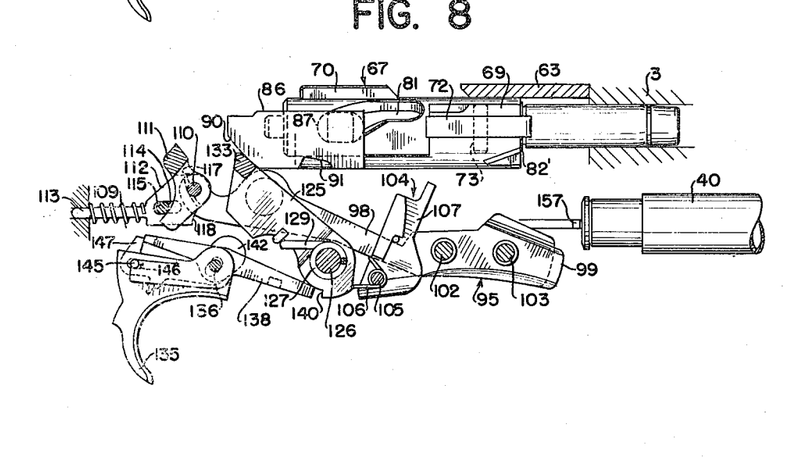

The rearward ends of the bars 97 and 98 have a transverse pin 110 on which is mounted a dog 111. This dog has an upward extension that makes contact with the notch 91 in the slide, as shown in FIGS. 3a, 5 to 8. The under and over cam 112 has a shaft 113 which enters a hole in the rear wall of the trigger housing and an elongated slot 114 in which the cam can have limited movement over the pin 115, and is pressed forward by the spring 109. This cam has a surface 116 (FIGS. 3a and 7) which bears against the pin 110 and thereby urges the rearward end of the lifter upward and the cartridge receiving end downward, as shown in FIGS. 5, 6 and 8. This cam surface 116 also engages the edge 117 on one side of the dog (FIGS. 3a, 9 and 16), when the dog is in the depressed position of FIG. 3a, to urge it in the clockwise direction so that it is induced automatically to enter the notch 91 when the slide is in rearward position.

It will be noted that the under and over cam has a lower surface 118 which can also engage the pin 110, as shown in FIG. 7, to hold the lifter rear end down and the forward end up. When the slide plate 86 goes forward beyond the dog 111, it is this cam 118 which holds the forward end of the lifter yieldably in the upper position, so as to press the cartridge against stop 63.

Figures 10, 11:
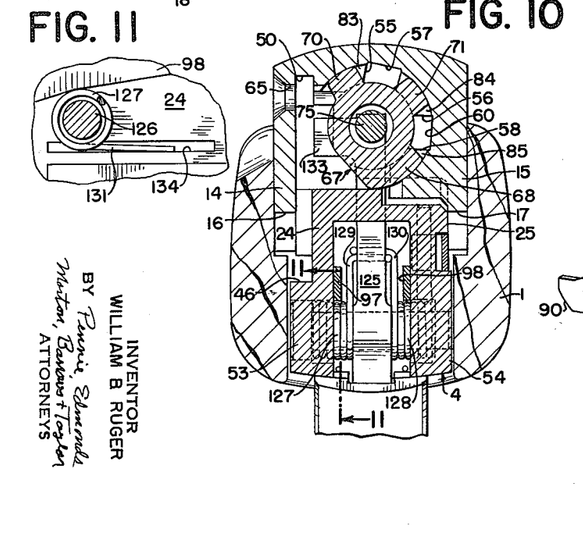
FIG. 10 is a sectional view at 10—10 of FIG. 3.
FIG. 11 is a sectional view at 11—11 of FIG. 10.
Figure 12:
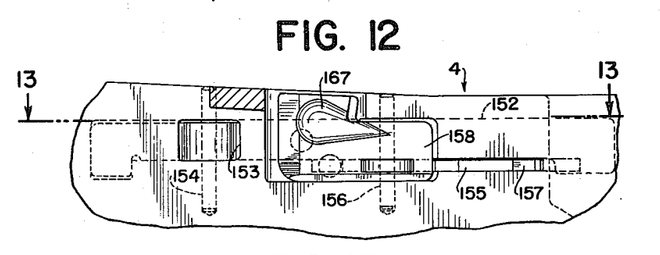
FIG. 12 is a side view at 12—12 of FIG. 9.

The hammer 125 is mounted on the pin 126 which passes through the sides of the trigger housing, and can swing within the space between the bars 97 and 98, and is turned in its clockwise striking position by the two coil springs 127 and 128 (FIG. 10). These springs have arms 129 and 130 which are hooked behind the hammer and arms 131 and 132 (FIG. 11) which bear against the bottom surface of grooves 134 on an inside surface of the trigger housing. The hammer has a side extension 133 which is engaged by the surface 90 on the slide to cock the hammer. With reference to FIG. 7 it will be noted that the hammer cannot enter the slot 91 because it is held downward at that position by the lower surface of bolt 67.

Figure 2:
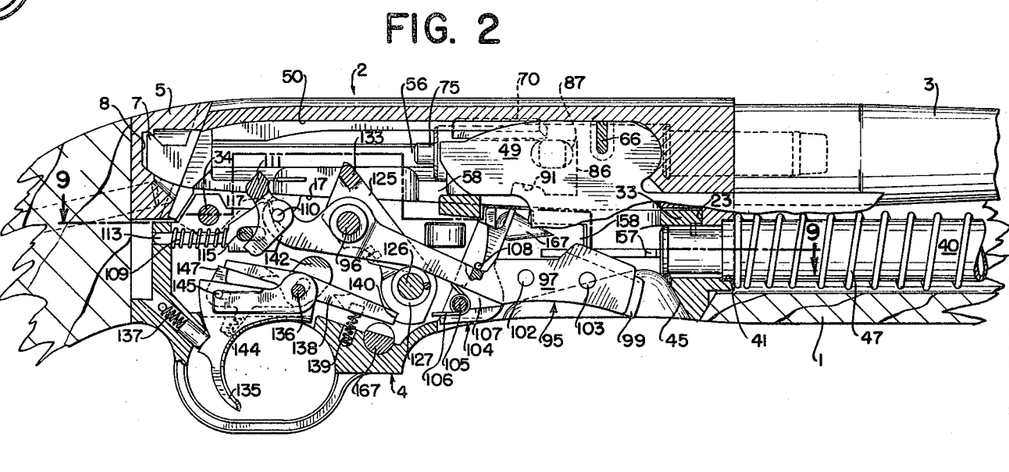
FIG. 2. is a side elevation, partly in section, of an enlarged portion of the rifle shown in FIG. 1 showing the position of the cartridges and the elements when the gun is ready for firing.

The trigger 135 is mounted in the trigger housing on the pin 136 and is urged in a counterclockwise direction by the coil spring 137 (FIG. 2). The sear 138 is also pivotally mounted on the pin 136 and is normally urged in a counterclockwise direction by the coil spring 139. The right end of the sear as shown in the drawings engages the sear notch 140 of the hammer. As best shown in FIGS. 3 and 16 the sear 138 is centrally cut out to receive therein the disconnector 142 which is mounted over the pin 136 on an elongated slot 143 which enables it to be moved angularly up and down. As best shown in FIGS. 2 and 3 the disconnector is urged in its upward position by a coil spring 144. The disconnector is also mounted within a milled out portion of the trigger on the pin 145. This pin passes through an elongated slot 146 in the disconnector which enables the disconnector to move laterally on the left end while moving angularly upward on the right end. As shown in FIG. 2 when the gun is in the cocked position ready for firing, the extension 147 on the disconnector assumes a position under the sear. At this time a pull on the trigger can turn the sear and release the hammer. Regardless of whether the trigger be held or released in the next sequence of firing, the hammer, on the cocking stroke strikes the disconnector 142 driving it downward and rearwardly to the position shown in FIGS. 4–7 whereby the sear is released from the trigger and may re-engage notch 140. On release of the trigger, the spring 144 pushes the disconnector forward so that the extension 147 assumes the firing position shown in FIG. 2.

As stated previously, the tubular magazine 40 is mounted at the rear in the annular groove 41 and has a plug 42 secured in the front end which has a projection 44 inserted in the opening in the block 12. The coil spring 150 bears on one end against the plug 42 and at the other end against the follower 151 which urges the cartridges towards the rear.

Figures 13, 14:
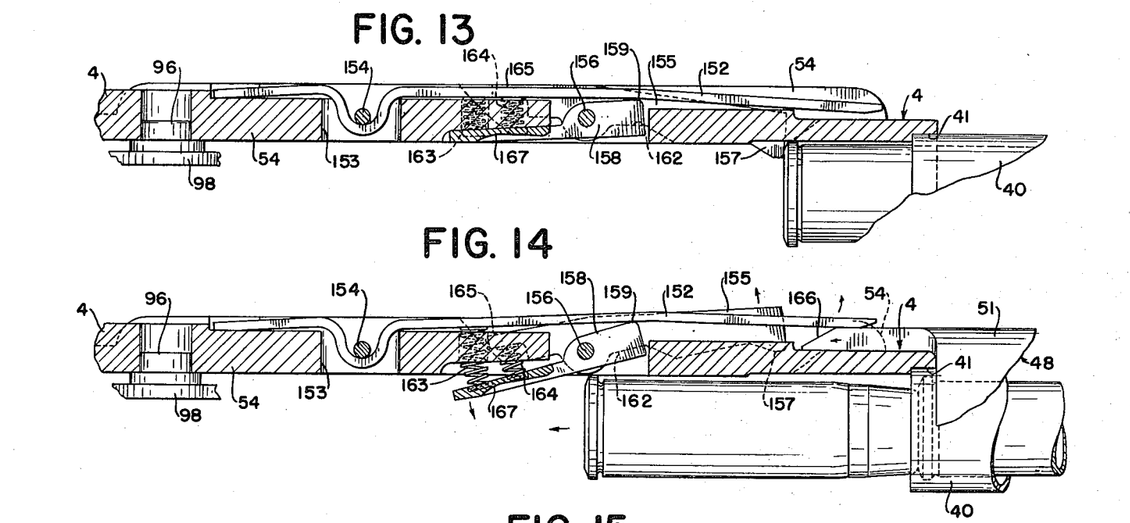
FIG. 13 is a plan view at 13—13 of FIG. 12.
FIGS. 14 and 15 are views similar to FIG. 13 illustrating the different positions of the elements in a sequence of movement of a cartridge from the tubular magazine.
Figure 15:
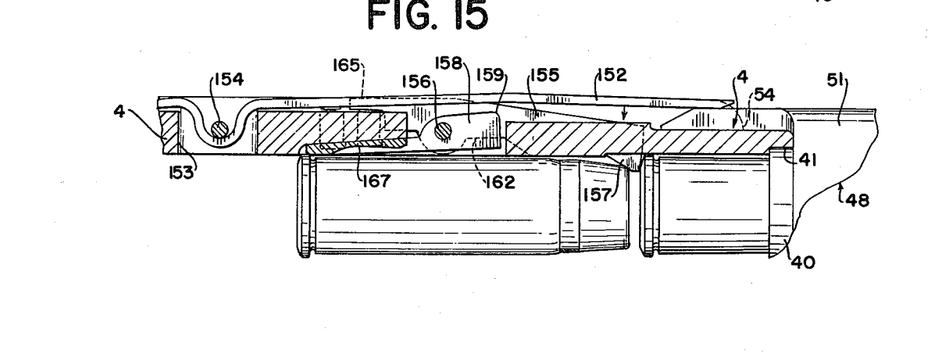

FIGS. 9, 12, 13, 14, 15 and 16 illustrate the means for controlling the movement of a cartridge from the magazine and the positioning of it on the cartridge lifter 95, while preventing obstructing movement of the next cartridge in the magazine. The left or back side 54 of the trigger housing as viewed in these figures is cut out to receive the flat spring 152 which is held in the pocket 153 by the pin 154. The right end of this spring normally presses towards the side 54. The cartridge stop 155 is pivotally mounted in the trigger housing by the pin 156. The right end of this stop as a projection 157 which can engage the rim of a cartridge as it emerges from the magazine and stop its further motion, as shown in FIG. 15. The cartridge operated stop actuator 158 is also pivoted on the pin 156 and has an edge 159 on which the spring 152 bears normally holding it within a recess in the trigger housing wall 25, as shown in FIG. 13. This actuator has a flat lateral lip 162 (FIG. 9) which engages an inner surface of the stop 155 to hold this stop in an inoperative position as shown in FIG. 14 only when the flat spring 152 is pushed outward. The stop actuator 158 is normally urged in the direction of the arrow of FIG. 14 by the coil spring 163. The stop actuator also carries a coil spring 164 which bears on the left extension 165 of the cartridge stop 155.

FIG. 13 represents a position of the members when the gun is loaded in which case the spring 152 holds the stop actuator 158 in the inoperative position and the spring 164 forces the cartridge stop 155 to turn clockwise and push the projection 157 into the path of the cartridge as shown in FIG. 13. When the gun fires and the slide 48 moves rearward the cam surface 166 pushes the end of spring 152 in the direction of the arrows (FIG. 14) thereby freeing the stop actuator 158 which, by reason of the lip 162, pushes the cartridge stop 155 outward thereby releasing the cartridge which travels rearward by reason of the spring 150. The rim of the cartridge strikes the curved cut 167 on the stop actuator and collapses spring 163 thereby allowing spring 164 to press the cartridge stop 155 inward causing the projection 157 to be urged into the path of the base of the next cartridge, thereby arresting the latter's further movement. This curved cut 167 holds the rim of the cartridge and prevents the base end from being thrown upward due to its rapid movement over the inclined surface of the lifter 95. A rib on the stop actuator may be used instead of this curved cut.

The conventional safety 167 can be pushed laterally to the safe or firing positions as desired, and is not shown in detail.

The rifle illustrated in the drawings functions as follows:

FIG. 2 shows the rifle with a cartridge in the barrel chamber and with the hammer cocked with the safety 167 in the firing position. FIG. 3 shows that the trigger has been pulled, the sear 138 has released the hammer and the hammer has driven the firing pin into igniting contact with the cartridge primer. The slide 48 is in the forward position shown in FIGS. 1 and 2. Also, the next cartridge in the magazine is held by the projection 157 as shown in FIGS. 2 and 13. When the bullet has passed beyond the gas port 92 the high pressure gas strikes the plunger 93' a short, hard blow driving the plunger into contact with the slide and sleeve 52. This imparts sufficient momentum to the slide to carry it rearward all the distance to the position shown in FIG. 4, and by the broken line in FIG. 5. In this rearward travel of the slide the lug 87 operating in the cam slot 81 turns the bolt from its locked position (approximately 42°) to its unlocked position, and carries it rearward with the ribs 70 and 71 guided in the grooves 57 and 60. The extractor 72 pulls the empty case rearward until it strikes the ejector 60, which rides in slot 74, and the case is thrown through the port 64. During this rearward travel, the cam surface 90 (FIGS. 3a and 18) on the slide engages the projection 133 on the hammer and turns it to the extreme position shown in FIG. 4 and the hammer strikes the sear disconnector 142 and forces it both downward and rearward so that it is out of contact with the sear. FIG. 3a shows the slide 49 moving towards the rearward end of its stroke. The extreme rearward limit of slide travel is reached when shoulder 51' on the slide strikes the front end of receiver 2. At this instant the dog 111 has been turned clockwise by the under and over cam 112 and as the slide moves forward under the action of the return spring 47 the dog engages the notch 91 and prevents any further return of the bolt and slide as shown in FIGS. 4, 5 and 6. When the slide has reached this rearward position the cam surface 166 thereof has pushed the spring 152 to the outward position shown in FIGS. 14 and 15 thereby removing pressure from the edge 159 of the stop actuator 158 so that spring 163 can move this stop actuator to the position of FIG. 14 which causes the lip 162 to raise the cartridge stop 155 and projection 157, releasing the first cartridge of the magazine so that it can be pushed by spring 150 onto the cartridge lifter 95 as shown in FIGS. 5, 6 and 14. When the slide and cartridge lifter are in the position of FIG. 4, a cartridge in the magazine is released and moves rearward as shown in FIG. 14. It strikes the cam surface 167 of the stop actuator 158 and depresses it to the position shown in FIG. 15. This causes the lip 162 of stop actuator 158 to be depressed and to release the cartridge stop 155 so that the projection 157 thereof is freed to assume the position of FIG. 15 and stop the rearward movement of the next cartridge in the magazine. The impact of the base of the cartridge against the lifter latch 104 swings it in a counterclockwise direction against the spring 106 and causes the pin 108 to pass beyond the edges of the inner bars 99 and 100 of the cartridge lifter (as shown in FIGS. 5 and 6). This release by the pin 108 frees the cartridge lifter 95 for upward movement. The pressure exerted on the dog 111 by the slide pivots the dog downward from the position shown in FIG. 5 to the position shown in FIG. 7. This depression of the rearward end of the lifter raises the forward end of the lifter from the position shown in FIG. 6 to the position shown in FIG. 7, raising the cartridge into the path of the forward moving bolt. Meanwhile, the pin 110 travels downward along the cam face 116 of the under and over cam pushing it backward against spring 109. As the slide approaches the position shown in FIG. 7 the under and over cam has moved to the position where the surface 118 bears on the upper surface of the pin 110 and the force of spring 109 supplements the action of dog 111 in raising the lifter to the position of FIG. 7. After the slide passes beyond the dog 111, it is only the cam surface 118 which holds the cartridge lifter in its upper position and the cartridge against stop 63 until the bolt, moving forward with the slide, has pushed the cartridge partially into the chamber. At that time, support of the cartridge by the lifter is no longer needed, and cam 82' on the bolt 67 strikes the lifter and forces it downward to a position beyond the dead center point of over and under cam 112. The cartridge lifter is then yieldingly held downward and when the lifter latch is manually released, can be pushed upward out of the way in order to load cartridges into the magazine.

After the last cartridge in the magazine has been fired, or if the slide is retracted manually when the gun is empty, the slide will remain back, locked in its rearward position by dog 111, until latch 107 is released by manual pressure.

Figure 17:
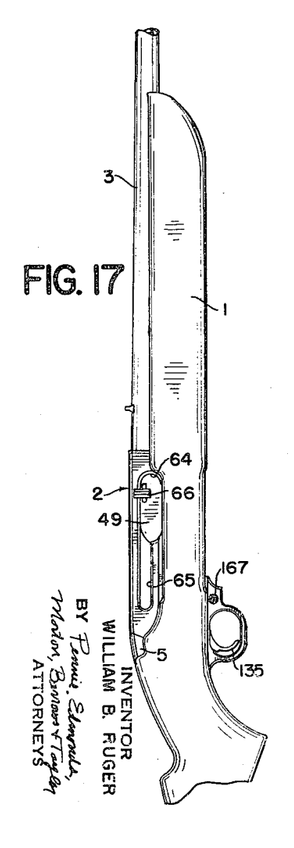
FIG. 17 is an outside side view of a rifle of the invention.

It will be noted with reference to FIG. 17 that the rifle has a single one piece stock and that the stock and receiver conceal nearly all of the slide, the tubular magazine, and the associate gas operated mechanism. The only part of the slide which can be seen is that shown through the ejector port 64. There are no openings or slots between the stock and the stationary metal parts. Another important feature is that the gun can be broken down by simply removing the screw 13 and pivoting the barrel upward to release the tail piece 7 from the block 5.

I claim:

1. A semi-automatic gas-operated gun which comprises a receiver with an attached barrel, a tubular magazine located below the barrel, a bolt including means to lock the bolt to the receiver, slide means for locking and unlocking the bolt reciprocal in the receiver, a trigger housing removably attached to the receiver in which is mounted a cartridge lifter, said housing being in operative connection with the tubular magazine so that a cartridge fed from the magazine can engage the lifter, a dog pivotally attached to the rearward part of the lifter having means to engage a notch in the slide to hold the slide and bolt rearward while a cartridge is being fed onto the lifter, and a spring operated cam having one cam surface which engages means on the lifter to push the rearward part of the lifter up and a second cam surface which engages means on the lifter to hold the rearward part of the lifter down and the forward part up.

2. A semi-automatic gun as defined in claim 1 which comprises a cartridge stop on an under surface of the receiver behind the barrel against which the cartridge can be guided when in the elevated position to enter the barrel.

3. A semi-automatic gas-operated rifle for using .44 caliber magnum cartridges which comprises a tubular magazine located below the barrel, a bolt in the receiver which is operated by a gas-driven slide, a cartridge lifter including means operated by the slide for lifting a cartridge placed thereon from the magazine to a position before the chamber of the barrel, and stop means in the receiver against which the top surface of the cartridge case is held by the lifter while supported on the lifter, whereby said cartridge having a substantially cylindrical case and a flat nosed bullet is held in alignment by the lifter and the means in the receiver for insertion into the chamber by the forward movement of the bolt.

4. The semi-automatic gas-operated gun of claim 1 wherein said cam has a two-way cam having a pin operable in a hole in the trigger housing, a coil spring on the pin which pushes the cam to engage means on the lifter, and means for guiding and limiting the movement of the cam.

5. The semi-automatic gas-operated gun of claim 4 in which the dog is controlled in its movement by both cam surfaces.

6. The semi-automatic gas-operated gun of claim 1 wherein said dog has a surface which engages one of the cam surfaces to hold the dog yieldably in position to engage the notch of the slide.

7. In a self-loading gun having a receiver, a barrel on the receiver, a breechblock in the receiver and a slide for operating the breechblock, a tubular magazine and a cartridge lifter for receiving a cartridge from the magazine and lifting it to a position to be inserted into the barrel by the breechblock, the improvement which comprises a dog pivotally connected to the rearward portion of the lifter having a portion which engages a notch in the slide to hold the slide and breechblock in their rearward positions during each firing cycle of operation, a cam having two cam surfaces mounted in operative connection with the receiver, said two cam surfaces comprising an upper cam surface which bears against means on the rearward part of the lifter and holds the rearward part of the lifter up and the forward part down, means for holding the forward part of the lifter down which is released by a cartridge entering the lifter, the slide pushing the dog down to raise the forward end of the lifter when the lifter is released, said two cam surfaces further comprising a lower cam surface which also bears against means on the rearward part of the lifter to hold the rearward part down and the forward part up, after the slide has passed forward beyond the dog.

8. In a self-loading gun having a receiver, a barrel on the receiver, a breechblock in the receiver and a slide for operating the breechblock, a tubular magazine and a cartridge lifter for receiving a cartridge from the magazine and lifting it to a position to be inserted into the barrel chamber by the breechblock, the improvement which comprises a cartridge stop in the upper part of the receiver having an under surface which is practically in line with the barrel chamber, said lifter being constructed and arranged to lift a cartridge to a position between the breechblock and the barrel chamber and hold it until engaged by the breechblock, the under surface of the cartridge stop being located to be engaged by the cartridge case when held in said position by the lifter, and means in cooperative association with the cartridge stop and the lifter whereby the cartridge is held in substantial axial alignment with the barrel chamber prior to the engagement of the breechblock with the cartridge.

References Cited in the file of this patent

UNITED STATES PATENTS

| | | |
|---|---|---|
| 1,574,701 | Schmeisser | Feb. 23, 1926 |
| 2,487,198 | Swebilius | Nov. 8, 1949 |
| 2,538,048 | Schaich | Jan. 16, 1951 |
| 2,596,841 | Davidson | May 13, 1952 |
| 2,741,862 | Sefried | Apr. 17, 1956 |
| 2,780,965 | Kunz | Feb. 12, 1957 |
| 2,817,917 | Colliander | Dec. 31, 1957 |
| 2,887,808 | Janson et al. | May 26, 1959 |
| 2,941,450 | Crittendon et al. | June 21, 1960 |
| 2,949,422 | Allyn | July 19, 1960 |